United States Patent
Cole et al.

(10) Patent No.: US 9,989,334 B2
(45) Date of Patent: Jun. 5, 2018

(54) SYSTEM AND METHOD FOR IDENTIFYING AND TRACKING STRAIGHT LINE TARGETS AND FOR DETECTING LAUNCH FLASHES

(71) Applicants: BAE SYSTEMS INFORMATION AND ELECTRONIC SYSTEMS INTEGRATION INC., Nashua, NH (US); Kevin C. Cole, Nashua, NH (US); Joseph M. Schlupf, Newburyport, MA (US); Lucas Lawrence-Hurt, Newmarket, NH (US)

(72) Inventors: Kevin C. Cole, Nashua, NH (US); Joseph M. Schlupf, Newburyport, MA (US); Michael N. Mercier, Nashua, NH (US); Lucas Lawrence-Hurt, Newmarket, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days. days.

(21) Appl. No.: 15/108,609

(22) PCT Filed: Oct. 20, 2015

(86) PCT No.: PCT/US2015/056476
§ 371 (c)(1),
(2) Date: Jun. 28, 2016

(87) PCT Pub. No.: WO2016/118200
PCT Pub. Date: Jul. 28, 2016

(65) Prior Publication Data
US 2016/0363421 A1    Dec. 15, 2016

Related U.S. Application Data

(60) Provisional application No. 62/066,413, filed on Oct. 21, 2014, provisional application No. 62/066,115, (Continued)

(51) Int. Cl.
G06K 9/00 (2006.01)
F41H 11/02 (2006.01)
(Continued)

(52) U.S. Cl.
CPC ............. *F41H 11/02* (2013.01); *F41G 3/147* (2013.01); *G01J 3/2803* (2013.01);
(Continued)

(58) Field of Classification Search
None
See application file for complete search history.

(56) References Cited

U.S. PATENT DOCUMENTS 4,406,429 A    9/1983   Allen
8,416,123 B1 * 4/2013   Mitchell ................. G01S 13/42
                                           342/107
(Continued)

FOREIGN PATENT DOCUMENTS

WO  PCT/US2015/056476    10/2015

OTHER PUBLICATIONS

Schultz et al., "Digital-Pixel Focal Plane Array Technology." Lincoln Laboratory Journal, vol. 20, No. 2, Aug. 2014, p. 44. [online] <URL: https://www.II.mit.edu/publications/labnotes/labnotes.html>.

*Primary Examiner* — Hadi Akhavannik
(74) *Attorney, Agent, or Firm* — McCarter & English LLP; Scott J. Asmus (57) ABSTRACT

Techniques for tracking a straight line object by creating a detection envelope between two detections selected from
(Continued)

temporally-discontinuous frames are discussed. The detections within the detection envelope can then be analyzed in order to determine whether they are associated with a straight line track between the outer detections of the envelope. Techniques for identifying a launch-flash are also discussed. Potential launch flashes are checked for energy duration, intensity and spectral ratio. Techniques for detecting a hostile fire based on a single-frame detection are additionally detected. Based on a frame length of the detection, it can be determined whether the detection correlates to a hostile fire.

12 Claims, 8 Drawing Sheets

Related U.S. Application Data filed on Oct. 20, 2014, provisional application No. 62/066,123, filed on Oct. 20, 2014.

(51) Int. Cl.
| | | |
|---|---|---|
| *F41G 3/14* | (2006.01) | |
| *G01S 3/784* | (2006.01) | |
| *G06T 7/20* | (2017.01) | |
| *G01J 3/28* | (2006.01) | |
| *G06T 7/246* | (2017.01) | |

(52) U.S. Cl.
CPC ............. *G01J 3/2823* (2013.01); *G01S 3/784* (2013.01); *G06T 7/20* (2013.01); *G06T 7/246* (2017.01); *G06T 2207/10004* (2013.01); *G06T 2207/30212* (2013.01); *G06T 2207/30241* (2013.01)

(56) References Cited

U.S. PATENT DOCUMENTS

| | | | |
|---|---|---|---|
| 8,421,015 | B1 | 4/2013 | Scott et al. |
| 8,831,284 | B2 * | 9/2014 | Thueux ................... G06T 7/262 |
| | | | 382/103 |
| 2006/0239559 | A1 * | 10/2006 | Maris ..................... G01S 13/723 |
| | | | 382/183 |
| 2007/0040062 | A1 * | 2/2007 | Lau ......................... F41G 3/147 |
| | | | 244/3.16 |
| 2009/0080700 | A1 | 3/2009 | Lau et al. |
| 2009/0220124 | A1 * | 9/2009 | Siegel ................. G06K 9/00342 |
| | | | 382/103 |
| 2011/0170798 | A1 * | 7/2011 | Tidhar .................. G01J 3/2803 |
| | | | 382/276 |
| 2012/0242864 | A1 | 9/2012 | Pauli et al. |
| 2014/0184806 | A1 | 7/2014 | Tidhar |

\* cited by examiner

FIG. 10

SYSTEM AND METHOD FOR IDENTIFYING AND TRACKING STRAIGHT LINE TARGETS AND FOR DETECTING LAUNCH FLASHES

RELATED APPLICATIONS

This application claims the benefit of, and priority to, U.S. provisional patent application Ser. No. 62/066,115, filed Oct. 20, 2014; U.S. provisional patent application Ser. No. 62/066,123, filed Oct. 20, 2014; and U.S. provisional patent application Ser. No. 62/066,413, filed Oct. 21, 2014, all of which are incorporated herein by reference in their entirety.

BACKGROUND

One use of optical sensors in a military setting is to detect and counter a launched ordinance as part of a threat detection system. Nearly all launched ordinances emit launch flashes and many such ordinance travel in a substantially straight line\ which may be tracked.

SUMMARY

In one embodiment, a method for tracking a straight line target is disclosed. The method includes selecting at least two temporally-discontinuous primary frames from a group of image frames. The method also includes creating a detection envelope between a first detection and a second detection, the first detection taken from a first primary frame and the second detection taken from a temporally-discontinuous second primary frame, the first detection and second detection being potential straight line targets. The method also includes associating a third detection within the detection envelope with a straight line track between the first detection and the second detection to identify a straight line target.

In another embodiment, a system for tracking a straight line target is disclosed. The system includes one or more processors configured to select at least two temporally-discontinuous primary frames from a number of image frames. The one or more processors are also configured to create a detection envelope between a first detection and a second detection, the first detection taken from a first primary frame and the second detection taken from a temporally-discontinuous second primary frame, the first detection and second detection being potential straight line targets. The one or more processors are further configured to associate a third detection within the detection envelope with a straight line track between the first detection and the second detection to identify a straight line target.

In another embodiment, a method for detecting an ordinance launch flash is disclosed. The method includes receiving an energy signature for at least one spectral band at a sensor of a focal plane array (FPA) and calculating at least one spectral sum data set by summing intensity values from each pixel within a data capture for the at least one spectral band. The method also includes applying a zero-mean temporal filter to the at least one spectral sum data set and identifying a spectral band output intensity threshold of the filtered spectral sum data set. The method further includes calculating a spectral emissions ratio corresponding to the energy signature. An energy signature is determined to correlate to a launch flash when: the application of the zero-mean temporal filter to the at least one spectral data set indicates that the duration of the energy signature is less than a pre-determined duration threshold, the identified spectral band output intensity exceeds a spectral band output intensity threshold, and the calculated spectral emissions ratio corresponding to the energy signature exceeds a spectral ratio threshold.

In another embodiment, a system for detecting an ordinance launch-flash is disclosed. The system includes a focal plane array (FPA) configured to receive an energy signature for at least one spectral band. The system also includes one or more processors configured to calculate at least one spectral sum data set by summing intensity values from each pixel within a data capture for the at least one spectral band and apply a zero-mean temporal filter to the at least one spectral sum data set. The one or more processors are also configured to identify a spectral band output intensity threshold of the filtered spectral sum data set. The one or more processors are further configured to calculate a spectral emissions ratio corresponding to the energy signature. An energy signature is determined to correlate to a launch flash when: the application of the zero-mean temporal filter to the at least one spectral data set indicates that the duration of the energy signature is less than a pre-determined duration threshold, the identified spectral band output intensity exceeds a spectral band output intensity threshold, and the calculated spectral emissions ratio corresponding to the energy signature exceeds a spectral ratio threshold.

In another embodiment, a method for detecting a hostile fire based on a single-frame detection is disclosed. The method includes capturing at least one detection in a field of view of an optical sensor and analyzing a shape of the at least one detection to determine a single-frame length of the detection. The method also includes comparing the single-frame length of the detection against a pre-determined single-frame length threshold and determining that the detection correlates to a hostile fire when the single-frame length of the detection exceeds the single-frame length threshold.

In another embodiment, a system for detecting a hostile fire based on a single-frame detection is disclosed. The system includes an optical sensor configured to capture at least one detection in a field of view of the optical sensor. The system also includes one or more processors configured to analyze a shape of the at least one detection to determine a single-frame length of the detection and analyze a shape of the at least one detection to determine a single-frame length of the detection. The one or more processors are also configured to compare the single-frame length of the detection against a pre-determined single-frame length threshold and determine that the detection correlates to a hostile fire when the single-frame length of the detection exceeds the single-frame length threshold.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

According to exemplary embodiments of the present invention, systems, devices, and methods are disclosed for detecting launch flashes and for detecting and tracking straight line targets.

Launch Flash Detection

A common use of optical sensors in a military setting is to detect and counter a launched ordinance. To achieve maximum protection of the host platform, and stay within the host platform processing limits, a launched threat should be detected as rapidly as possible while tracking as few false threats as possible. Current launch flash detection techniques and systems rely on various methods of tracking a detected object to verify straight line motion and threat status. Only then do such systems begin to identify a threat and start to engage countermeasures. However, such methods utilize valuable time to identify a track, and often identify many false tracks and create high processor usage.

Figure 1:
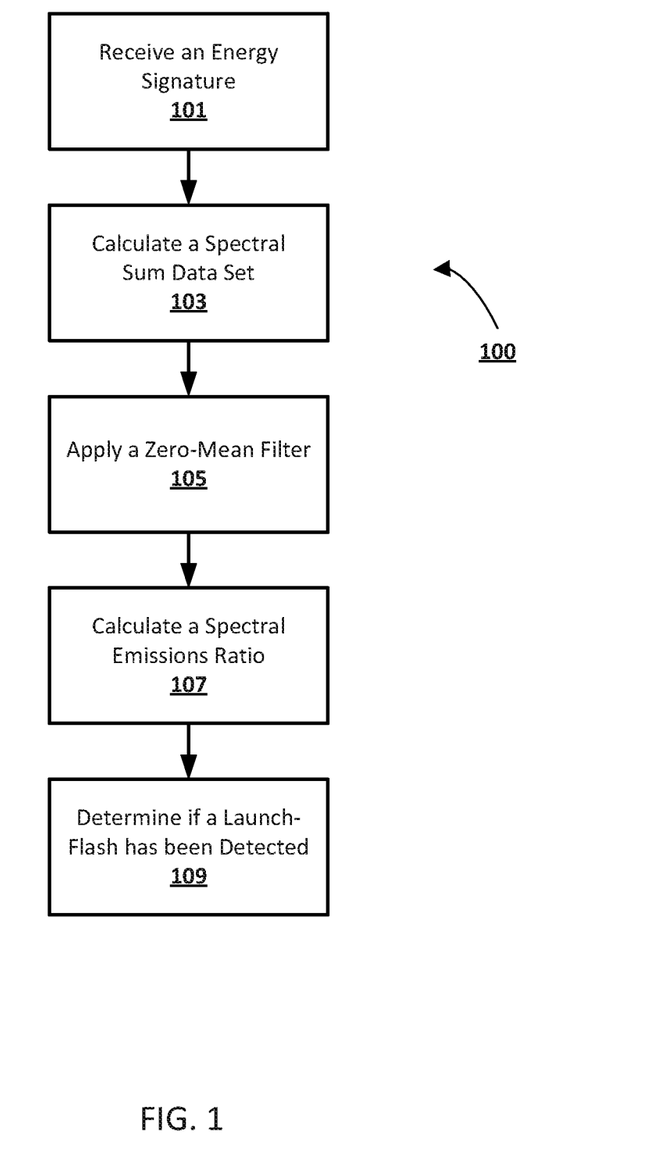
FIG. 1 is a flow chart illustrating a method for detecting an ordinance launch-flash, according to an exemplary embodiment of the present invention.

FIG. 1 is a flow chart illustrating a method 100 for detecting an ordinance launch-flash in a detection system, according to an exemplary embodiment of the present invention. In step 101, an energy signature is received for at least one spectral band at a sensor of a Focal Plane Array (FPA). The focal plane arrays are generated by digital cameras that have multiple small light/color sensors with very small focal lenses. The cameras may include infrared (IR) cameras, The focal plane array configuration dictates the number of pixels in an acquired image. In one embodiment, the FPA may be located on an airborne host platform. In step 103, a spectral sum data set is calculated by summing the intensity values from each pixel within a data capture for the at least one spectral band. In step 105, a zero-mean temporal filter is applied to the at least one spectral sum data set. As used herein, a zero-mean temporal filter is a filter that is non-biased and that, given a normalization noise input (e.g., Gaussian noise), the output of the filter will be zero. As a result, the output of such a filter typically returns zero, rather than near zero, values in normal operating circumstances and returns a high value only when the signal being searched for is present. The zero mean temporal filter is a filter applied to each spectral band over time. In exemplary embodiments, the zero-mean filter accounts for the short "pulse" nature of a launch-flash and eliminates more extended constant energy sources. This is the first criteria used by the exemplary embodiment to analyze detected energy signatures as potential launch flashes. For example, the zero mean temporal filter may be applied to the spectral band data set to determine, in step 106, whether the energy signature is a "pulse" lasting less time than a pre-determined duration threshold. If the energy signature exhibits a pulse that has a longer duration than the duration threshold, then the result is inconsistent with a launch flash and the energy signature does not need to be further examined as a potential launch flash. Alternatively, if the energy signature pulse lasts less time than the duration threshold, then the result is consistent with what would be expected in the event of a launch flash and the analysis sequence continues. In step 107, a spectral band output intensity is determined. In an exemplary embodiment, a spectral band output intensity is determined based on the filtered primary band signal, minus the filtered reference band signal. In an alternative example, the spectral band output intensity can be determined based on the ratio of the primary signal to the reference signal. The identified spectral band output intensity is compared, in step 108, to a spectral band output intensity threshold to determine whether the strength of the detected energy signature is sufficient to be a launch flash. In an exemplary embodiment, the intensity threshold can vary based on the in-band output of the object being detected. This intensity threshold is the second criteria of the exemplary embodiment. If the identified spectral band output intensity is less than the spectral band output intensity threshold, the energy signature can be ignored. Alternatively, if the identified spectral band output intensity is greater than the spectral band output intensity threshold, the analysis of the energy signature continues. In step 109, a spectral emissions ratio corresponding to the detected energy signature is calculated. Each launch-flash emission has a particular ratio of emission intensity between the primary band and the reference band. In step 110, the calculated spectral emissions ratio is compared to a spectral emissions ratio threshold to eliminate or block from analysis false detections that do not emit a spectral ratio that is indicative of a threat (i.e. where the energy signal is not indicative of a launch flash). This emissions ratio the third criteria of the exemplary embodiment. In exemplary embodiments, the spectral band ratio threshold can eliminate a flash caused by a reflection of the sun, the sun shining between buildings or trees, or other flashes of light that are not launch flashes. In an exemplary embodiment, the spectral band ratio threshold can vary based on the type of threat being detected, and can be used to help identify the threat and distinguish it from other threats or false alarm sources. In step 111, if all three criteria have been met, a determination is made by the detection system that the detected energy signature is from a launch-flash. That is a launch threat is identified if the filtered spectral sum data set exhibits an expected pulse characteristic over time that is shorter than a specified duration threshold, if the intensity of the launch flash exceeds the spectral band output intensity threshold and, and if the spectral emissions ratio exceeds a spectral ratio threshold corresponding to a launch-flash. It should be appreciated that although the criteria discussed above have been referred to as a first, second and third criteria, the criteria may be analyzed in any order. Further, embodiments employing additional criteria are also within the scope of the present invention.

In one embodiment, a directionality of the detected launch-flash can be determined based on the orientation and/or location of the sensor that detected the energy signature. For example, if the sensor located at the rear of a host platform detected the energy signature, it can be determined that the launch-flash is approaching the host platform from the rear.

Figure 2:
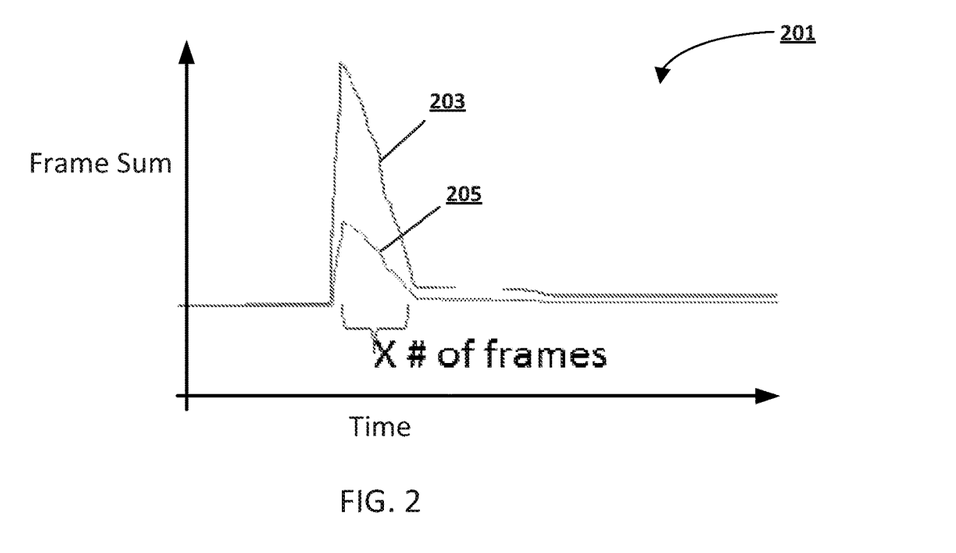
FIG. 2 is a graphical representation of spectral sum data sets, according to an exemplary embodiment of the present invention.

FIG. 2 is a plot 201 of spectral sum data sets, wherein a sum of spectral values is plotted over time for each spectral band, according to an exemplary embodiment of the present invention. In an exemplary embodiment, the intensity values from each pixel in a data capture, or frame, are summed for each specific spectral band. In the particular embodiment shown in FIG. 2, plot line 203 represents the primary output of the filter and plot line 205 represents the reference output of the filter. As discussed above, in one embodiment, a combination of three criterion are used to prevent false detections. First, a zero-mean temporal filter can be applied to a spectral sum data set collected over time. This zero-mean filter accounts for the short "pulse" nature of a launch-flash and ignores more extended constant sources. Second, a spectral band output intensity threshold can be applied. This intensity threshold takes advantage of the relatively high radiative intensity of a launch-flash in order to remove false detections. Third, a spectral band ratio threshold can be applied. Because each launch-flash emission has a particular ratio of spectral band emission intensity, the spectral band ratio threshold can eliminate or block from analysis false detections that do not emit a spectral ratio indicative of a threat. A combination of these techniques can effectively identify a threat by detecting its launch flash, thus reducing the time required to identify a threat.

Figure 3:
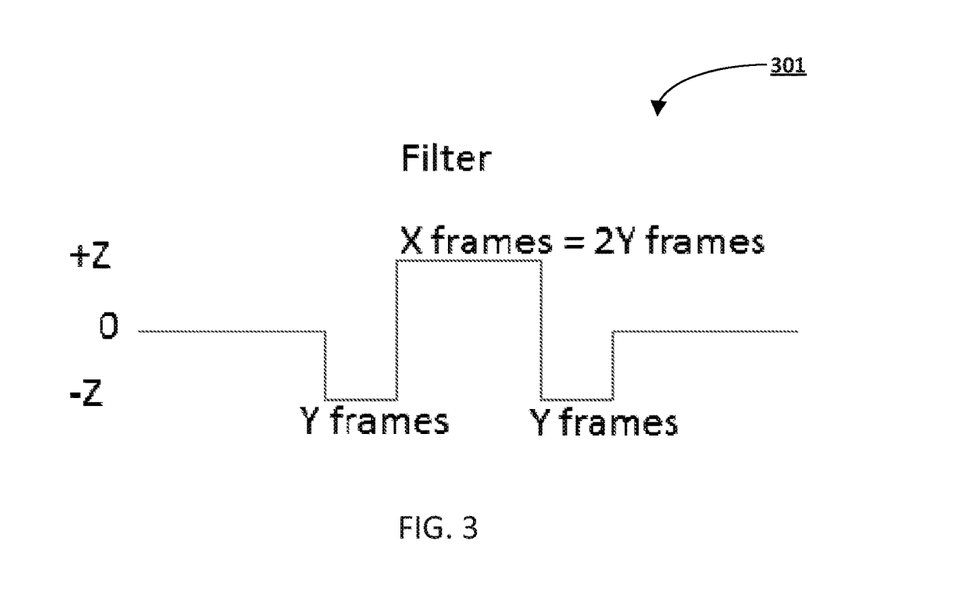
FIG. 3 is a graphical illustration of a zero-mean filter, according to an exemplary embodiment of the present invention.

FIG. 3 depicts a plot 301 of a zero-mean temporal filter, which is applied to each spectral band over time, according to an exemplary embodiments of the present invention. In an exemplary embodiment, the value of Z can be any number, so long as the absolute values of Z and −Z are equal. The value of X, in this embodiment, is equal to the approximate width of the signal being searched for, and the value of Y at −Z level is selected to zero-mean the filter in such a way that it typically returns to zero if the input to the filter is flat, linearly increasing, linearly decreasing, or is Gaussian noise. The plot may also be characterized as a simplified digitized Ricker wavelet. In an exemplary embodiment, if a spike in output value from the filter exceeds the established threshold, then a threat is possible. If the threat is possible under the zero-mean temporal filter, then the spectral band output threshold evaluates whether the potential threat is radiant enough to be a launch-flash. If a predetermined intensity level in a prescribed spectral band is insufficient, then the detected event cannot be a launch flash and the event can be disregarded. Finally, launch-flash emissions each have a particular ratio of spectral emissions; thus, detections that do not meet a pre-specified spectral ratio threshold are also disregarded and blocked from further analysis.

Single Frame Hostile Fire Declaration

In addition to detecting potential launch flashes, a detection system may also be used to track straight line targets. One example of a potential straight line target is a tracer round or other ballistic projectile. Other conventional techniques for detecting threats or hostile fire, in the case of tracer rounds, declare the hostile fire over multiple frames. Once a round enters the field of view of a sensor on a host platform, it is detected on each frame until the round leaves the field of view. These detections are linked together to form tracks, and higher detection counts reduce the potential for false alarms. However, shots that miss a host platform by very close distances might only be in the field of view for a single frame. In such instances, a track cannot be formed and the declaration will be missed when using conventional techniques.

Figure 4:
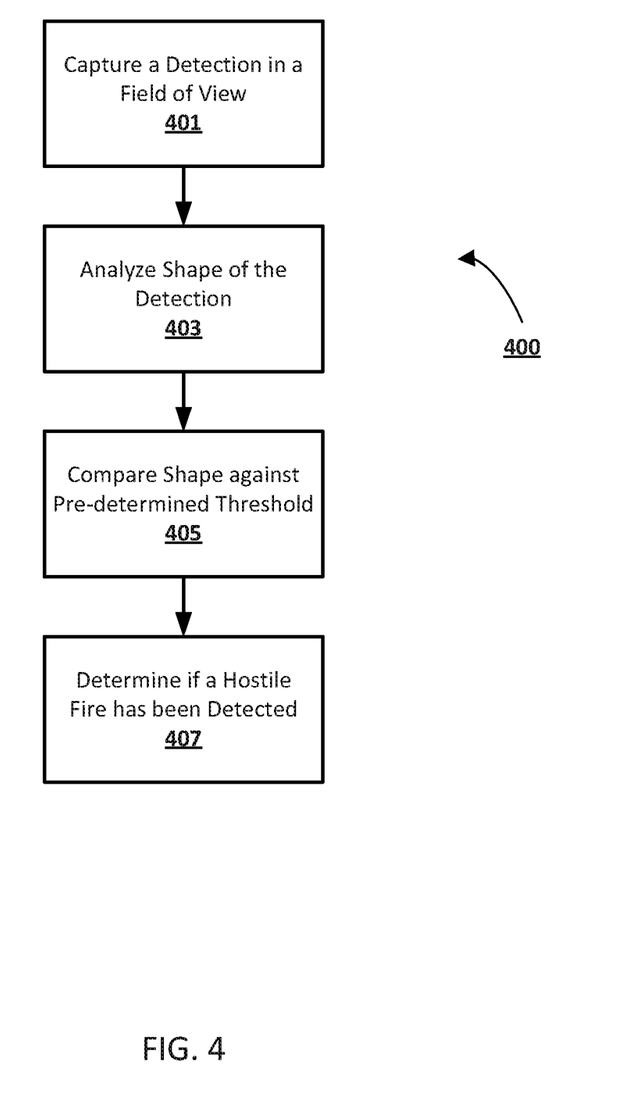
FIG. 4 is a flow chart illustrating a method for detecting a hostile fire based on a single-frame detection, according to an exemplary embodiment of the present invention.

FIG. 4 is a flow chart illustrating a method 400 for detecting a hostile fire based on a single-frame detection, according to an exemplary embodiment of the present invention. According to an exemplary embodiment, a hostile fire can be detected and declared using a single-frame detection by analyzing the shape, direction, and extent of the detection. In step 401, a detection in a field of view of an optical sensor is captured. In step 403, the shape of the detection is analyzed in order to determine a single-frame length corresponding to the detection. In step 405, the single-frame length of the detection is compared against a pre-determined single-frame length threshold. In exemplary embodiments, detections that are of average or greater than average distance away from a host platform will have short, dash-like detections that can be tracked over time in each frame of the FOV. These dash-like detections will each have a length that is less than the pre-determined single-frame length threshold. However, a detection that is very close and moving relatively fast will create a more elongated linear detection that is longer than the pre-determined single-frame length threshold. In step 407, it is determined that a hostile fire has been detected based on the comparison performed in step 405 where the detection exceeds the single-frame length threshold. As will be appreciated, the single-frame length threshold can be altered or adjusted in order to customize the sensitivity of the single-frame detection techniques described herein.

Figure 5:
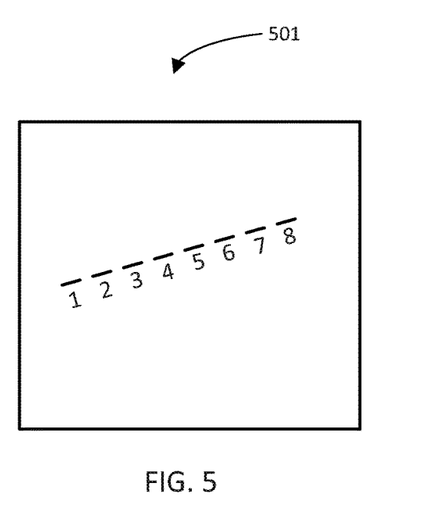
FIG. 5 illustrates numerous detections at an average or greater than average distance from a host platform.

FIG. 5 illustrates a graph 501 showing numerous detections at an average or greater than average distance from a host platform. In this particular example, an object is tracked over eight sequential frames, and a series of short detections are captured. Because none of the detections shown in graph 501 are longer than the pre-determined single-frame length threshold, no hostile fire is declared.

Figure 6:
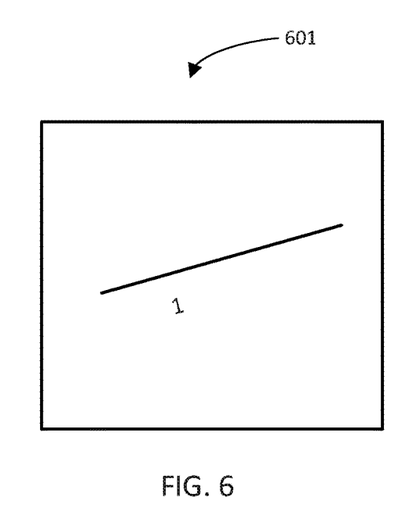
FIG. 6 illustrates an elongated single-frame detection indicative of a hostile fire, according to an exemplary embodiment of the present invention.

FIG. 6 illustrates a graph 601 showing an elongated single-frame detection indicative of a hostile fire, according to exemplary embodiments of the present invention. In this particular embodiment, a single detection is captured in one frame, and this detection is determined to be longer than the pre-determined single-frame length threshold. When such an elongated detection is present in a single frame, it can be reliably identified as a single-frame hostile fire detection.

Tracking a Straight Line Target

Many missiles, bullets, and other threats move approximately along a straight line track. Often these threats are aimed to hit a particular, moving host platform. Detecting such threats and accurately determining any track along which they are moving is critical to any successful evasion, countermeasure deployment, or counterattack. Conventional threat-detection systems analyze detections in multiple data captures, or frames, taken over time. Such systems evaluate all combinations of detections in each temporal frame to determine whether or not any of them can be associated with a straight line track. Many such threat-detection systems lack a means for determining the range to the detection. Therefore, the system must instead associate detections to a straight line by determining whether each of the detection combinations are moving in a single direction and whether they are in approximately the same plane. One disadvantage of such systems is that, as the number of detections increases, the number of detection combinations increases very rapidly. Therefore, in order to satisfy limits on processing resources, the system must have a simple way of filtering a majority of the unrelated combinations from consideration. Traditional filters predict the location of a subsequent detection based on two or more previous detections, and look for a predicted detection within a virtual error "envelope" of the predicted location. In such a system a "detection envelope" refers to a virtual elliptical planar representation in pixel space that covers an area of interest in the image data being analyzed where a $3^{rd}$ detection is expected beyond the first two detections. However, if the temporal signal of the detections is not entirely range dependent, this method can generate unacceptably large detection envelopes, omit valid detections, or both.

According to the present invention, a straight line target tracking method evaluates detections in temporally-discontinuous primary frames to create a detection envelope for each dimension in a reference frame. In an exemplary embodiment, the primary frames are image frames from the primary band while the reference frames are image frames from the reference band. As used herein, temporally-discontinuous means that the frames are not sequential, but rather include at least one frame between them. These detection envelopes are used to estimate where potentially associated detections will be located in frames that temporally fall between the discontinuous primary frames. In order to ensure that no valid tracks are omitted, the estimation method must account for properties of three-dimensional space. This is accomplished by scaling the envelope based on the angle between the primary frame detections. Using this method, the track can be extended by repeating the envelope estimation using the detections from the new frame and temporally-discontinuous previously-tracked frame. If the new envelope encompasses tracked detections from the previously-tracked frame immediately prior to the new frame, then the new detection is likely to be part of the track.

Figure 7:
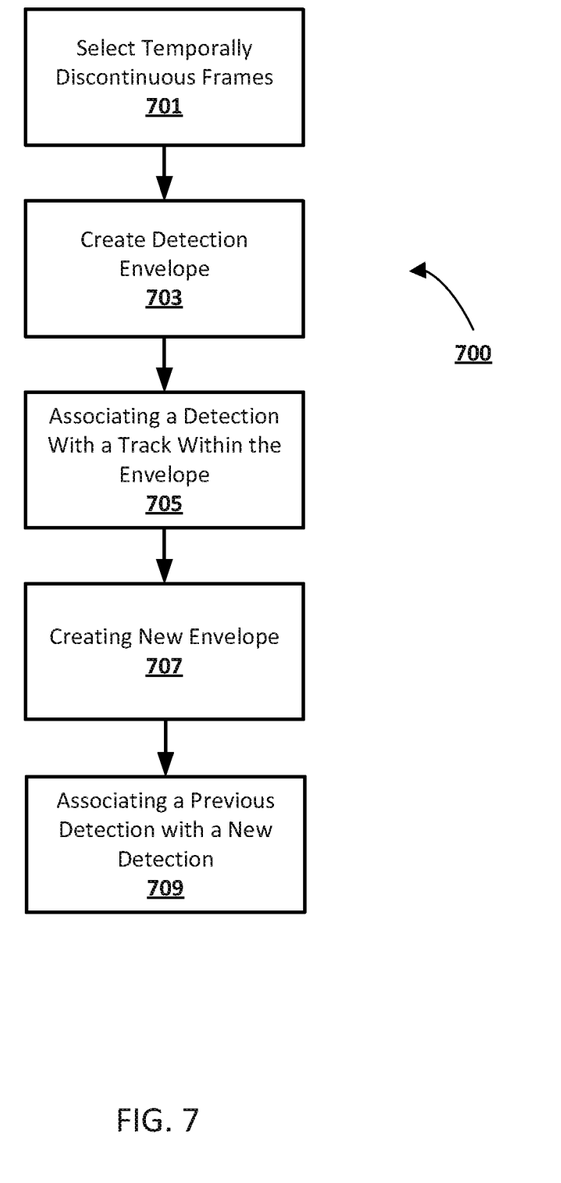
FIG. 7 is a flow chart illustrating a method for tracking a straight line target, according to an exemplary embodiment of the present invention.

FIG. 7 is a flow chart illustrating a method 700 for tracking a straight line target, according to an exemplary embodiment of the present invention. In step 701, at least two temporally-discontinuous frames are selected from a plurality of image frames. In step 703, a detection envelope is created between a first detection and a second detection representing potential straight line targets. In an exemplary embodiment, the first frame selected is frame N, and the second frame is N+2, in order to create a detection envelope in frame N+1. It will be appreciated that other different frame selections are possible within the scope of the present invention. The first detection is taken from a first primary frame and the second detection taken from a temporally-discontinuous second primary frame. In an exemplary embodiment, a detection envelope is created on an image plane based on a comparison of detections, hereinafter referred to as outer detections, from each of a set of temporally-discontinuous primary frames. The detection envelopes are used to estimate where potentially associated detections, hereinafter referred to as inner detections, will be located in frames residing between the discontinuous primary frames. In an exemplary embodiment, the size of the detection envelope corresponds to an angle between the first detection and the second detection. In order to ensure that the envelope is sized such that no valid tracks are omitted, the estimation method in an exemplary embodiment must account for properties of three-dimensional space. In step 705, a third detection within the detection envelope is associated with a straight line track between the first detection and the second detection. In an exemplary embodiment, associating the third detection with a straight line track includes performing planar analysis to determine that the third detection forms a track with the first and second detections. The first and second detections, also called outer detections, can fall on outer edges of a detection envelope. Any detections within the envelope can be tested in order to determine if they form a track between the outer detections, while any detections outside of the envelope can be disregarded. In exemplary embodiments, if the outer detections are close together, then inner detections are expected to be directly between them. However, if the outer detections are far apart, then a larger envelope is needed to accommodate the increased number of possible paths of the track. This is accomplished by scaling the envelope based on the angle between the primary frame detections in the relevant dimensional coordinate. The larger the angle is, the larger the envelope must be. Once a track is identified within the envelope, the track can be extended by repeating the envelope estimation process and generating a new detection envelope. In step 707, a new detection envelope is created between a third primary frame with a possible relevant detection and a temporally-discontinuous previously-tracked frame. In this new iteration, the new outer detections will comprise a detection from the new frame and a detection from a temporally-discontinuous previously-tracked frame. The new envelope is created in relation to each of these new outer detections. In one exemplary embodiment, the new detection envelope can cover the entire distance between the detection of the third primary frame and the detection of the previously tracked frame. Alternatively, the new detection envelope can cover only a portion of the distance between the detection of the third primary frame and the detection of the previously tracked frame. In step 709, at least one previously-tracked detection taken from within the new detection envelope is associated with a new detection from the third primary frame, thus extending the track. In one example embodiment, if the new envelope encompasses tracked detections from the previously-tracked frame immediately prior to the new frame, then the new detection is likely to be part of the track. However, if there are no previously-tracked detections from the immediately prior frame inside the new envelope, then the new detection can be excluded.

Figure 8:
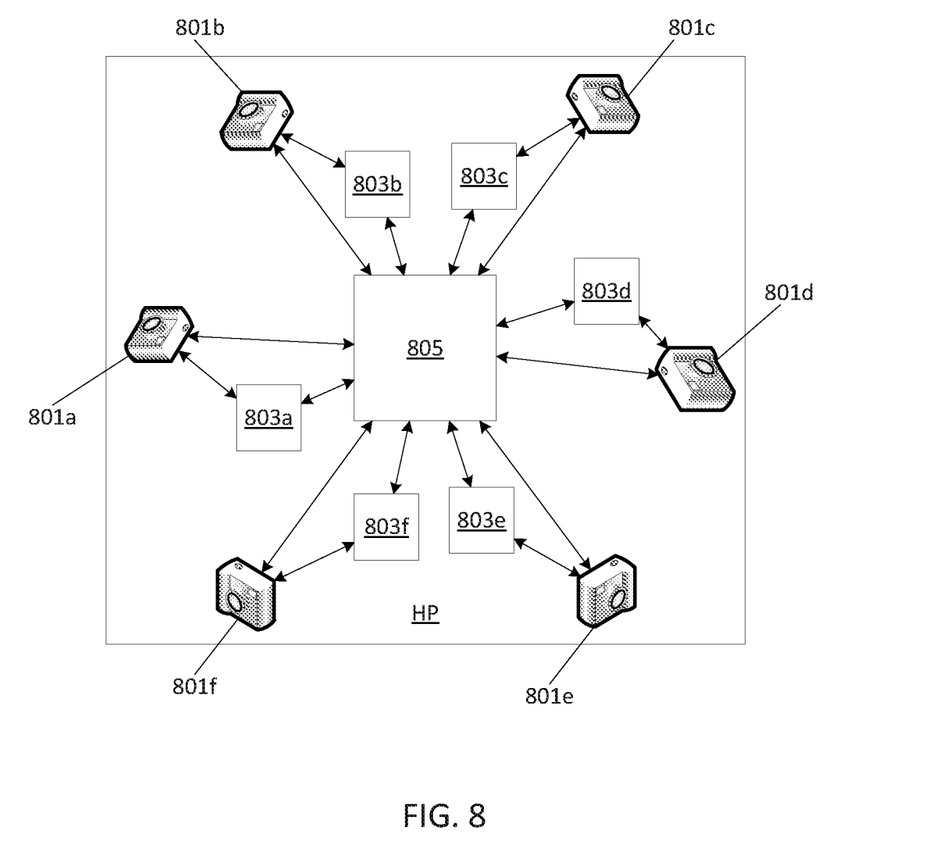
FIG. 8 is an example block diagram depicting various components which can be used to implement an embodiment of a distributed point source detection system.

FIG. 8 is an example imaging system block diagram of an exemplary distributed on-board imaging system 800. The on-board imaging system 800 can be installed on a host platform HP. The system 800 includes a plurality of image sensors 801a-f installed on the host platform HP, each of the image sensors 801a-f being in electronic communication with at least one processor 803a-f, 805 installed on the host platform HP. As shown in FIG. 8, each image sensor 801a-f is in electronic communication with both a dedicated processor 803a-f and a central processor 805. However, it will be apparent in view of this disclosure that, in accordance with various embodiments, one or more of the image sensors 801a-f can connect only to a central processor 805. It will further be apparent in view of this disclosure that, in accordance with various embodiments, one or more of the image sensors 801a-f can connect only to a dedicated processor 803a-f. It will still further be apparent in view of this disclosure that any combination of sensors per processor or processors per sensor can be used in accordance with various embodiments.

Image sensors 801a-f can be any suitable device such as, for example but not limited to, digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof. It will be apparent in view of this disclosure that image sensors 801*a-f*, in accordance with various embodiments can encompass any sensor configured to capture electromagnetic radiation in any spectrum for producing an image, including, for example, infrared radiation, visible light, ultraviolet radiation, x-rays, etc.

Dedicated processors 803*a-f* and central processor 805 can each include, for example, one or more field-programmable gate arrays (FPGA), microprocessors, application specific integrated circuits, integrated circuits, monolithic integrated circuits, microchips, programmable logic devices, complex programmable logic devices, any other suitable processing devices, or combinations thereof. For example, in some embodiments, each dedicated processor 803*a-f* can be a FPGA for providing temporary storage of a limited number of data captures acquired by the a corresponding image sensor 801*a-f* and a coarse initial analysis while the central processor 805 can be a microprocessor for conducting more detailed analysis as needed. In various embodiments, the central processor 805 can perform all processing functions, eliminating the need for dedicated processors 803*a-f*. In various embodiments, the dedicated processors 803*a-f* can perform all processing functions, eliminating the need for a central processor 805. It will be apparent in view of this disclosure that any other combinations an ratios of processors and image sensors can be used in accordance with various embodiments.

Figure 9:
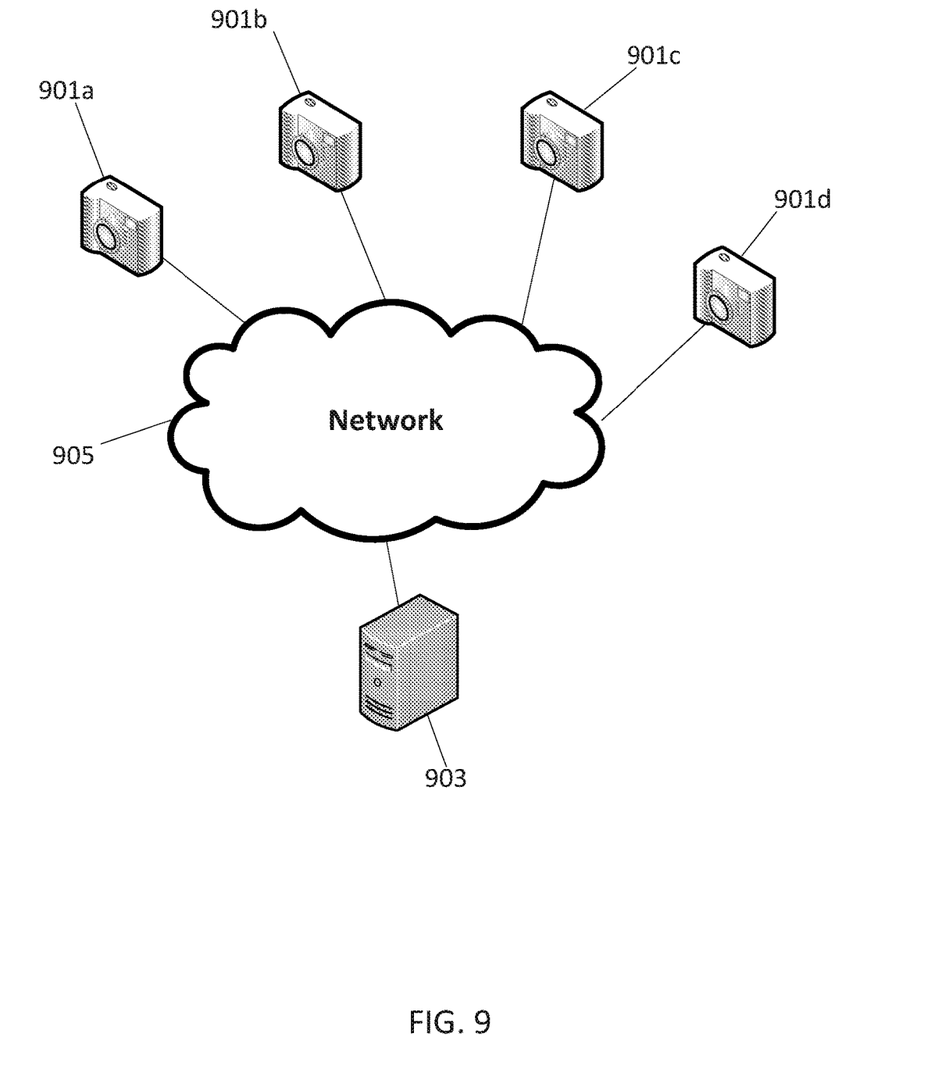
FIG. 9 is an example block diagram depicting various components which can be used to implement an embodiment in a distributed point source detection system.

FIG. 9 is an example imaging block diagram of certain distributed embodiments. Although FIG. 8 and portions of the exemplary discussion above make reference to a centralized system 800 operating with on one or more co-located image sensors and/or processors, one will recognize that various of the components and modules within the system 800 may instead be distributed across a network 905 in separately or remotely located image sensors 901*a-d* such as digital cameras, infrared cameras, optical cameras, video cameras, infrared video cameras, charge-coupled device (CCD) sensors, complementary metal-oxide-semiconductor (CMOS) sensors, focal plane arrays, microbolometers, indium antimonide sensors, indium gallium arsenide sensors, mercury cadmium telluride sensors, quantum well infrared photodetectors, N-type metal-oxide-semiconductor (NMOS) sensors, medical imaging devices, x-ray detectors, any other image sensor, or combinations thereof and processing systems 903 such as one or more server systems, desktop computer devices, mobile computer devices, field-programmable gate arrays, microprocessors, application specific integrated circuits, integrated circuits, monolithic integrated circuits, microchips, programmable logic devices, complex programmable logic devices, any other suitable processing devices, or combinations thereof. As one example, data captures acquired by the image sensors 901*a-d* can be received by the remote processing system(s) 903 for frame registration and comparison. In some embodiments, the remote processing system(s) 903 can provide feedback to one or more of the image sensors 901*a-d* based on the frame registration and comparison. In some distributed remote imaging systems, the image sensors 901*a-d* and processing systems 903 of the system 800 can be separately located and can be in communication with one another across the network 905.

Figure 10:
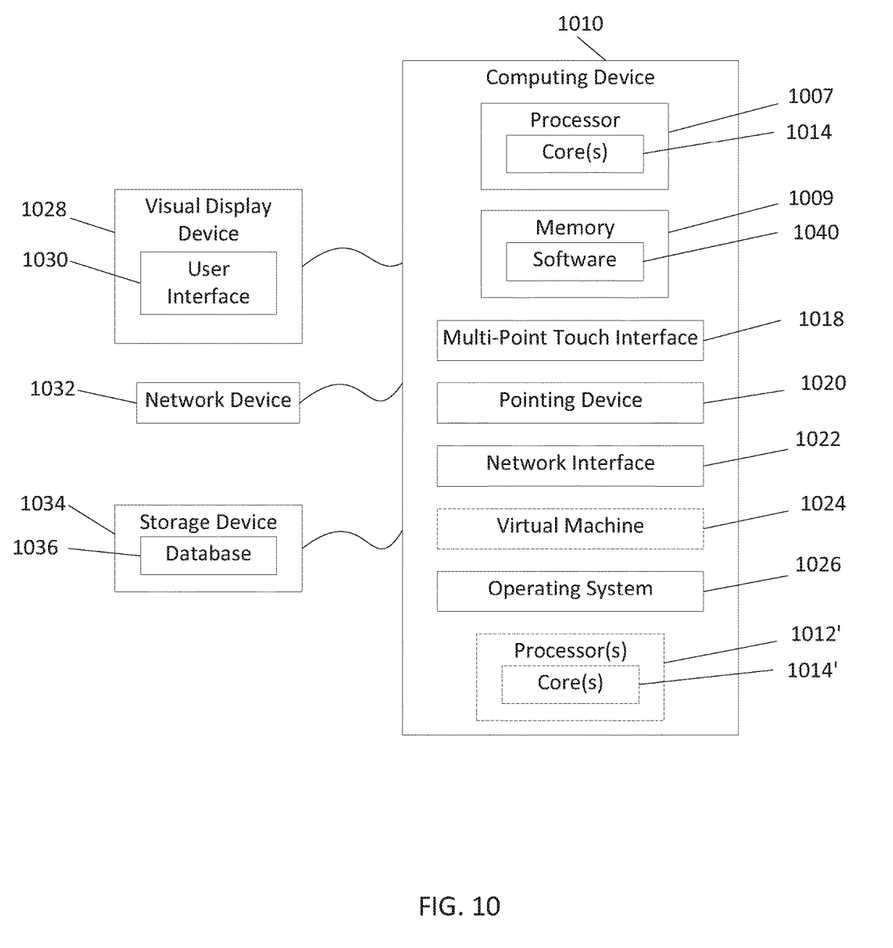
FIG. 10 is an example computational device block diagram depicting various components which can be used to implement an embodiment of a point source detection system.

FIG. 10 is a block diagram of an exemplary computing device 1010 such as can be used, or portions thereof, in accordance with various embodiments. The computing device 1010 can include one or more non-transitory computer-readable media for storing one or more computer-executable instructions or software for implementing exemplary embodiments. The non-transitory computer-readable media can include, but are not limited to, one or more types of hardware memory, non-transitory tangible media (for example, one or more magnetic storage disks, one or more optical disks, one or more flash drives), and the like. For example, memory 1009 included in the computing device 1010 can store computer-readable and computer-executable instructions or software for performing the operations disclosed herein. For example, the memory 1009 can store a software application 1040 which is configured to perform various of the disclosed operations (e.g., generating a plurality of user interface elements based on the quantities of data stored in the memory 1009). The computing device 1010 can also include configurable and/or programmable processor 1007 and an associated core 1014, and optionally, one or more additional configurable and/or programmable processing devices, e.g., processor(s) 1012' and associated core(s) 1014' (for example, in the case of computational devices having multiple processors/cores), for executing computer-readable and computer-executable instructions or software stored in the memory 1009 and other programs for controlling system hardware. Processor 1007 and processor(s) 1012' can each be a single core processor or multiple core (1014 and 1014') processor. In some embodiments, processor 1007 and processor(s) 1012' can each be one or more of a field-programmable gate array, a microprocessor, an application specific integrated circuit, integrated circuit, a monolithic integrated circuit, a microchip, a programmable logic device, a complex programmable logic device, any other suitable processing device, or combinations thereof.

Virtualization can be employed in the computing device 1010 so that infrastructure and resources in the computing device can be shared dynamically. A virtual machine 1024 can be provided to handle a process running on multiple processors so that the process appears to be using only one computing resource rather than multiple computing resources. Multiple virtual machines can also be used with one processor.

Memory 1009 can include a computational device memory or random access memory, such as DRAM, SRAM, EDO RAM, and the like. Memory 1009 can also include, for example, flip-flops, memory blocks, RAM blocks, programmable read-only memory, and the like. Memory 1009 can include other types of memory as well or combinations thereof.

A user can interact with the computing device 1010 through a visual display device 1028, such as a computer monitor, which can display one or more user interfaces 1030 that can be provided in accordance with exemplary embodiments. The computing device 1010 can include other I/O devices for receiving input from a user, for example, a keyboard or any suitable multi-point touch interface 1018, or a pointing device 1020 (e.g., a mouse). The keyboard 1018 and the pointing device 1020 can be coupled to the visual display device 1028. The computing device 1010 can include other suitable conventional I/O peripherals.

The computing device 1010 can also include one or more storage devices 1034, such as a hard-drive, CD-ROM, or other computer readable media, for storing data and computer-readable instructions and/or software that perform operations disclosed herein. Exemplary storage device 1034 can also store one or more databases 1036 for storing any suitable information required to implement exemplary embodiments. The databases 1036 can be updated manually or automatically at any suitable time to add, delete, and/or update one or more items in the databases.

The computing device 1010 can include a network interface 1022 configured to interface via one or more network devices 1032 with one or more networks, for example, Local Area Network (LAN), Wide Area Network (WAN) or the Internet through a variety of connections including, but not limited to, standard telephone lines, LAN or WAN links (for example, 802.11, T1, T6, 56 kb, X.25), broadband connections (for example, ISDN, Frame Relay, ATM), wireless connections, controller area network (CAN), or some combination of any or all of the above. The network interface 1022 can include a built-in network adapter, network interface card, PCMCIA network card, card bus network adapter, wireless network adapter, USB network adapter, modem or any other device suitable for interfacing the computing device 1010 to any type of network capable of communication and performing the operations described herein. Moreover, the computing device 1010 can be any computational device, such as a workstation, desktop computer, server, laptop, handheld computer, tablet computer, or other form of computing or telecommunications device that is capable of communication and that has sufficient processor power and memory capacity to perform the operations described herein.

The computing device 1010 can run any operating system 1026, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 1026 can be run in native mode or emulated mode. In an exemplary embodiment, the operating system 1026 can be run on one or more cloud machine instances.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other aspects, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

We claim:

1. A method for tracking a straight line target, the method comprising:
   selecting at least two temporally-discontinuous primary frames from a plurality of image frames;
   creating a detection envelope between a first detection and a second detection, the first detection taken from a first primary frame and the second detection taken from a temporally-discontinuous second primary frame, the first detection and second detection being potential straight line targets; and
   associating a third detection within the detection envelope with a straight line track between the first detection and the second detection to identify a straight line target.

2. The method of claim 1, wherein a size of the detection envelope corresponds to an angle between the first detection and the second detection.

3. The method of claim 1, wherein associating the third detection with a straight line track includes performing planar analysis to determine that the third detection forms a track with the first and second detections.

4. The method of claim 1, further comprising:
   creating a new detection envelope between a third primary frame and a temporally-discontinuous previously-tracked frame; and
   associating at least one previously-tracked detection taken from within the new detection envelope with at least one new detection from the third primary frame.

5. A system for tracking a straight line target, the system comprising:
   one or more processors configured to:
   select at least two temporally-discontinuous primary frames from a plurality of image frames;
   create a detection envelope between a first detection and a second detection, the first detection taken from a first primary frame and the second detection taken from a temporally-discontinuous second primary frame, the first detection and second detection being potential straight line targets; and
   associate a third detection within the detection envelope with a straight line track between the first detection and the second detection to identify a straight line target.

6. The system of claim 5, wherein a size of the detection envelope corresponds to an angle between the first detection and the second detection.

7. The system of claim 5, wherein associating the third detection with a straight line track includes performing planar analysis to determine that the third detection forms a track with the first and second detections.

8. The system of claim 5, wherein the one or more processors are further configured to:
   create a new detection envelope between a third primary frame and a temporally-discontinuous previously-tracked frame; and
   associate at least one previously-tracked detection taken from within the new detection envelope with at least one new detection from the third primary frame.

9. A non-transitory computer readable medium storing instructions executable by a processing device, the instructions implementing a method for tracking a straight line target, wherein execution of the instructions causes the processing device to:
   select at least two temporally-discontinuous primary frames from a plurality of image frames;
   create a detection envelope between a first detection and a second detection, the first detection taken from a first primary frame and the second detection taken from a temporally-discontinuous second primary frame, the first detection and second detection being potential straight line targets; and
   associate a third detection within the detection envelope with a straight line track between the first detection and the second detection to identify a straight line target.

10. The non-transitory computer readable medium of claim 9, wherein a size of the detection envelope corresponds to an angle between the first detection and the second detection.

11. The non-transitory computer readable medium of claim 9, wherein associating the third detection with a straight line track includes performing planar analysis to determine that the third detection forms a track with the first and second detections.

12. The non-transitory computer readable medium of claim 9, wherein execution of the instructions further causes the processing device to:
   create a new detection envelope between a third primary frame and a temporally-discontinuous previously-tracked frame; and
   associate at least one previously-tracked detection taken from within the new detection envelope with at least one new detection from the third primary frame.

* * * * *